United States Patent
Chen (10) Patent No.: US 11,372,805 B2
(45) Date of Patent: Jun. 28, 2022

(54) METHOD AND DEVICE FOR INFORMATION PROCESSING

(71) Applicant: TENCENT TECHNOLOGY (SHENZHEN) COMPANY LIMITED, Shenzhen (CN)

(72) Inventor: Gong Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 423 days.

(21) Appl. No.: 15/633,459

(22) Filed: Jun. 26, 2017

(65) Prior Publication Data

US 2017/0293614 A1 Oct. 12, 2017

Related U.S. Application Data

(63) Continuation of application No. PCT/CN2016/078569, filed on Apr. 6, 2016.

(30) Foreign Application Priority Data

Apr. 23, 2015 (CN) .......................... 201510196844.2

(51) Int. Cl.
*G06F 16/00* (2019.01)
*G06F 16/955* (2019.01)
(Continued)

(52) U.S. Cl.
CPC ............ *G06F 16/00* (2019.01); *G06F 16/955* (2019.01); *G06Q 30/02* (2013.01);
(Continued)

(58) Field of Classification Search
CPC ... G06F 16/00; G06F 16/955; G06Q 30/0242; G06Q 30/0251
See application file for complete search history.

(56) References Cited

U.S. PATENT DOCUMENTS 8,626,585 B1   1/2014 Mhatre
9,047,622 B1 * 6/2015 Shaw .................. G06Q 30/02
(Continued)

FOREIGN PATENT DOCUMENTS

CN   101127624   2/2008
CN   102222300   10/2011
(Continued)

OTHER PUBLICATIONS

Lardironois, Frederic: YouTube Announces a New Commenting System, Powered By Google+, With Threaded, Ranked and Private Conversations, available at: https://techcrunch.com/2013/09/24/youtube-announces-a-new-google-powered-commenting-system/, last accessed Nov. 20, 2021. (Year: 2013).*
(Continued)

*Primary Examiner* — Katherine Kolosowski-Gager
(74) *Attorney, Agent, or Firm* — Crowell & Moring LLP (57) ABSTRACT

In some embodiments, a method for information processing includes: acquiring, based on announcement information pulled by a terminal from a ranked list of announcement information in advance, interactive operation indication information uploaded by the terminal on an interactive platform, the interactive operation indication information being associated with the announcement information; acquiring interactive operational data corresponding to the interactive operation indication information; and updating ranking information of the announcement information in the ranked list of announcement information based on the interactive operational data. The announcement information is passively pulled from the ranked list of announcement information based on the ranking information, and the ranking information includes at least one of a pulling probability and a ranking position. Effects of the announcement information are improved, a pushing cost of the
(Continued)

announcement information is reduced, and a pushing threshold of the announcement information is lowered.

12 Claims, 5 Drawing Sheets

(51) Int. Cl.
*G06Q 30/02* (2012.01)
*G06Q 50/00* (2012.01)

(52) U.S. Cl.
CPC ..... *G06Q 30/0242* (2013.01); *G06Q 30/0251* (2013.01); *G06Q 50/01* (2013.01)

(56) References Cited

U.S. PATENT DOCUMENTS

| | | |
|---|---|---|
| 2003/0005056 A1 | 1/2003 | Yamamoto et al. |
| 2008/0162510 A1 | 7/2008 | Baio et al. |
| 2009/0276453 A1* | 11/2009 | Trout .................. G06F 16/435 |
| 2011/0106630 A1 | 5/2011 | Hegeman et al. |
| 2011/0258039 A1* | 10/2011 | Patwa .................. G06Q 30/00 |
| | | 705/14.45 |
| 2012/0041817 A1* | 2/2012 | Priyadarshan ..... G06Q 30/0244 |
| | | 705/14.43 |
| 2013/0091013 A1* | 4/2013 | Wang ................. G06Q 30/0241 |
| | | 705/14.53 |
| 2014/0214545 A1 | 7/2014 | Zhang et al. |
| 2014/0278758 A1* | 9/2014 | Christiansen ...... G06Q 30/0269 |
| | | 705/7.29 |

FOREIGN PATENT DOCUMENTS

| | | |
|---|---|---|
| CN | 104035941 | 9/2014 |
| CN | 104809627 | 7/2015 |
| JP | 2003-203084 A | 7/2003 |
| JP | 2012-150746 A | 8/2012 |
| JP | 2013510371 A | 3/2013 |
| WO | WO 2014/200716 A1 | 12/2014 |

OTHER PUBLICATIONS

Japanese Office Action with Translation Issued in Application No. 2017-531398 dated Apr. 24, 2018.
International Search Report for International App No. PCT/CN2016/078569 dated Jun. 28, 2016, 4 pages.
Second Office Action with Translation Issued for Japanese Patent Application No. 2017-531398 dated Oct. 16, 2018, in 8 pages.
European Office Action corresponding to Application No. 16 782 558.7 dated Jul. 28, 2020 (11 pages).

* cited by examiner

METHOD AND DEVICE FOR INFORMATION PROCESSING

CROSS REFERENCES OF RELATED APPLICATIONS

The present application is a continuation of International Application No. PCT/CN2016/078569, titled "METHOD AND DEVICE FOR INFORMATION PROCESSING", filed on Apr. 6, 2016, which claims priority to Chinese patent application No. 201510196844.2 titled "METHOD AND APPARATUS FOR INFORMATION PROCESSING" and filed with the State Intellectual Property Office on Apr. 23, 2015, both of which are incorporated herein by reference in their entireties.

TECHNICAL FIELD

The present disclosure relates to the technical field of Internet, and in particular to a method and an apparatus for information processing.

BACKGROUND

With the development and improvement of Internet technologies, terminals such as mobile phone and tablet computer have become an indispensable part of people's lives. In addition to communication, the terminals may be used to transfer a file, record a video, play a game, and the like.

With development of technologies, interaction between the users can be realized on an interactive platform via the terminals. Further, announcement information (notification, advertisement, and the like) may be pulled via the terminal, to be provided to the user for clicking on and watching. Taking an advertisement as an example, when pushing a new advertisement, an advertiser often needs to offer a higher bid price to raise ranking position of the advertisement in a ranking list so as to obtain a high exposure rate for the advertisement, which is apt to lead to vicious competition, thereby affecting an effect of the announcement information such as an advertisement, increasing a pushing cost of the announcement information, and raising a pushing threshold of the announcement information.

SUMMARY

It is provided a method and an apparatus for information processing according to embodiments of the present disclosure, for improving an effect of announcement information, reducing a pushing cost of the announcement information, and lowering a pushing threshold of the announcement information.

In the embodiments of the present disclosure, a method for information processing is provided according to the embodiments of the present disclosure. The method includes acquiring, based on announcement information pulled by a terminal from a ranked list of announcement information in advance, interactive operation indication information uploaded by the terminal on an interactive platform. The interactive operation indication information is associated with the announcement information. The method further includes acquiring interactive operational data corresponding to the interactive operation indication information. The method further includes updating ranking information of the announcement information in the ranked list of announcement information based on the interactive operational data. The announcement information is passively pulled from the ranked list of announcement information based on the ranking information, and the ranking information includes at least one of a pulling probability and a ranking position.

In the embodiments of the present disclosure, an apparatus for information processing is provided according to the embodiments of the present disclosure. The apparatus includes an information acquisition unit, a data acquisition unit and an information updating unit. The information acquisition unit is configured to acquire, based on announcement information pulled by a terminal from a ranked list of announcement information in advance, interactive operation indication information uploaded by the terminal on an interactive platform. The interactive operation indication information is associated with the announcement information. The data acquisition unit is configured to acquire interactive operational data corresponding to the interactive operation indication information. The information updating unit is configured to update ranking information of the announcement information in the ranked list of announcement information based on the interactive operational data. The announcement information is passively pulled from the ranked list of announcement information based on the ranking information, and the ranking information includes at least one of a pulling probability and a ranking position.

In the embodiments of the present disclosure, based on announcement information pulled by a terminal from a ranked list of announcement information in advance, interactive operation indication information uploaded by the terminal on an interactive platform is acquired, the interactive operation indication information being associated with the announcement information. Interactive operational data corresponding to the interactive operation indication information is acquired. Ranking information of the announcement information in the ranked list of announcement information is updated based on the interactive operational data. The interactive operational data corresponding to the interactive operation indication information is added, and the ranking information of the announcement information in the ranked list of announcement information is updated based on the interactive operational data, thereby affecting the ranking information of the announcement information by utilizing the interactive operations of a user, and thus avoiding vicious competition that is caused by affecting the ranking of the announcement information via a bid price. Further, an effect of the announcement information is improved, a pushing cost of the announcement information is reduced, and a pushing threshold of the announcement information is lowered.

BRIEF DESCRIPTION OF THE DRAWINGS

The accompanying drawings used in the description of the embodiments will be described briefly as follows, so that the technical solutions according to the embodiments of the present disclosure will become more apparent. It is clear that the accompanying drawings in the following description are only some embodiments of the present disclosure. For those skilled in the art, other accompanying drawings may be obtained according to these accompanying drawings without any creative work.

DETAILED DESCRIPTION

The technical solutions according to the embodiments of the present disclosure will be described with details in conjunction with the drawings. It is clear that the disclosed embodiments are a few of the embodiments of the present disclosure, rather than all of the embodiments. Other embodiments obtained by those skilled in the art based on the embodiments of the present disclosure without creative work, fall into the scope of the present disclosure.

A method for information processing according to an embodiment of the present disclosure may be applied to a scenario in which ranking information of announcement information, such as an advertisement and a notification, in a ranked list is updated and adjusted. For example, an apparatus for information processing may acquire, based on announcement information pulled by a terminal from a ranked list of announcement information in advance, interactive operation indication information uploaded by the terminal on an interactive platform. The interactive operation indication information is associated with the announcement information. The apparatus for information processing may acquire interactive operational data corresponding to the interactive operation indication information. The apparatus for information processing may update ranking information of the announcement information in the ranked list of announcement information based on the interactive operational data. The interactive operational data corresponding to the interactive operation indication information is added, and the ranking information of the announcement information in the ranked list of announcement information is updated based on the interactive operational data, thereby affecting the ranking information of the announcement information by utilizing the interactive operations of a user, and thus avoiding vicious competition that is caused by affecting the ranking of the announcement information via a bid price. Further, an effect of the announcement information is improved, a pushing cost of the announcement information is reduced, and a pushing threshold of the announcement information is lowered.

The apparatus for information processing according to the embodiments of the present disclosure may be a background server, including but not limited to servers capable of acquiring interactive operation indication information, maintenance announcement information, a ranked list and the like uploaded by a terminal on an interactive platform. The terminal may include terminal devices capable of performing an interactive operation on the announcement information, such as a tablet computer, a smart phone, a laptop, a palmtop computer, a personal computer and a mobile internet device (MID). Preferably, the interactive platform is an interactive platform for an instant messaging application. The announcement information may be group information pushed by an announcement operator to a predetermined group of users, such as an advertisement or a notification. Specifically, the announcement information may be passively pulled from the ranked list of announcement information based on certain ranking information. The ranking information includes at least one of a pulling probability and a ranking position.

A method for information processing according to the embodiments of the present disclosure will be described with details in conjunction with FIG. 1 and FIG. 2.

Figure 1:
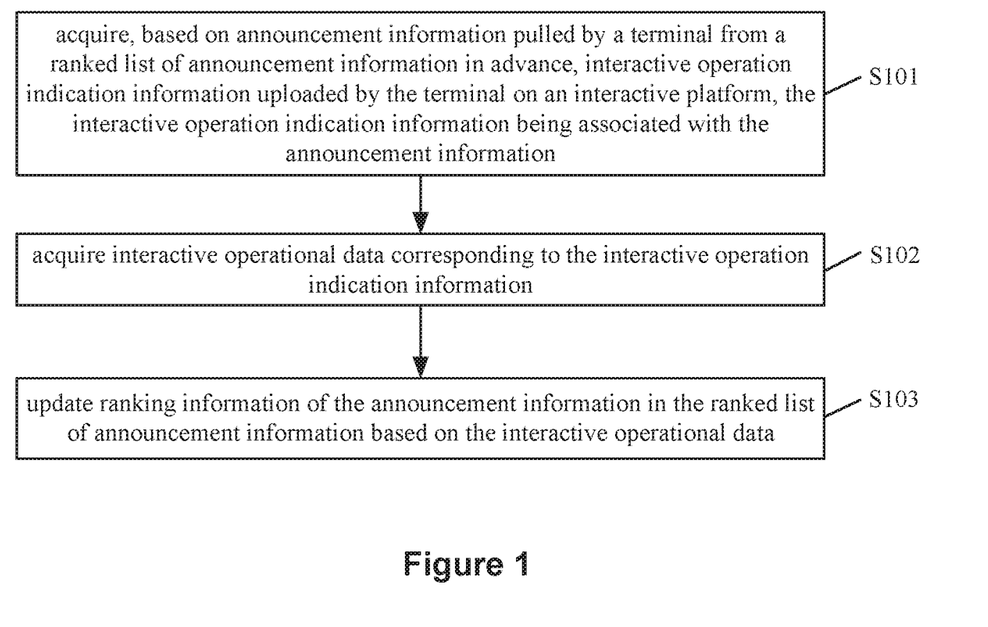
FIG. 1 is a schematic flowchart showing a method for information processing according to an embodiment of the present disclosure.

Reference is made to FIG. 1, which is a schematic flowchart showing a method for information processing according to an embodiment of the present disclosure. As shown in FIG. 1, the method according to an embodiment of the present disclosure may include step S101 to step S103 as follows.

In step S101, based on announcement information pulled by a terminal from a ranked list of announcement information in advance, interactive operation indication information uploaded by the terminal on an interactive platform is acquired. The interactive operation indication information is associated with the announcement information.

Specifically, based on the announcement information pulled by the terminal from the ranked list of announcement information in advance, a user may perform an interactive operation on the announcement information via the terminal. The interactive operation includes, for example, inputting a comment at a predetermined position under the announcement information, adding a concern identifier for the announcement information, clicking on the concern identifier to concern the announcement information, and the like. The terminal may generate interactive operation indication information associated with the announcement information based on the interactive operation. The interactive operation indication information may specifically be record information generated in response to the interactive operation on the announcement information by the user. For example, in response to inputting a comment at the predetermined position under the announcement information, record information of one comment may be generated. The interactive operation indication information may be uploaded to the interactive platform by the terminal, and the interactive operation indication information uploaded by the terminal on the interactive platform may be acquired by an apparatus for information processing.

In step S102, interactive operational data corresponding to the interactive operation indication information is acquired.

Specifically, the apparatus for information processing may acquire the interactive operational data corresponding to the interactive operation indication information. It is to be understood that, each of the interactive operation indication information associated with the announcement information has corresponding interactive operation data. For example, the interactive operation data corresponding to inputting a comment at the predetermined position under the announcement information may be the same as that corresponding to adding a concern identifier for the announcement information. Practically, different interactive operational data may be set for a comment and a concern identifier, so as to distinguish the weights of them, and the interactive operational data corresponding to a comment should be greater than that corresponding to a concern identifier.

In step S103, the ranking information of the announcement information in the ranked list of announcement information is updated based on the interactive operational data.

Specifically, the apparatus for information processing may update the ranking information of the announceinformation in the ranked list of announcement information based on the interactive operational data. Further, the apparatus for information processing may calculate an interactive score of the announcement information based on the interactive operational data, and acquire in sequence the interactive score of each of remaining announcement information in the ranked list of announcement information except for the announcement information. The apparatus for information processing may calculate an interactive coefficient of the announcement information based on the interactive score of the announcement information and the interactive score of each of the remaining announcement information. The apparatus for information processing may calculate an information evaluating score of the announcement information based on the interactive coefficient and the historical evaluation attribute value of the announcement information. The apparatus for information processing may update the ranking information of the announcement information in the ranked list of announcement information based on the information evaluating score of the announcement information and the information evaluating score of each of the remaining announcement information, and turn to execute step S101. The ranking information may specifically include at least one of a pulling probability of the announcement information and a ranking position of the announcement information in ranked list. Specifically, the pulling probability is expressed as the probability that the announcement information may be pulled by the terminal.

In the embodiments of the present disclosure, based on announcement information pulled by a terminal from a ranked list of announcement information in advance, interactive operation indication information uploaded by the terminal on an interactive platform is acquired, the interactive operation indication information being associated with the announcement information. Interactive operational data corresponding to the interactive operation indication information is acquired. Ranking information of the announcement information in the ranked list of announcement information is updated based on the interactive operational data. The interactive operational data corresponding to the interactive operation indication information is added, and the ranking information of the announcement information in the ranked list of announcement information is updated based on the interactive operational data, thereby affecting the ranking information of the announcement information by utilizing the interactive operations of a user, and thus avoiding vicious competition that is caused by affecting the ranking of the announcement information via a bid price. Further, an effect of the announcement information is improved, a pushing cost of the announcement information is reduced, and a pushing threshold of the announcement information is lowered.

Figure 2:
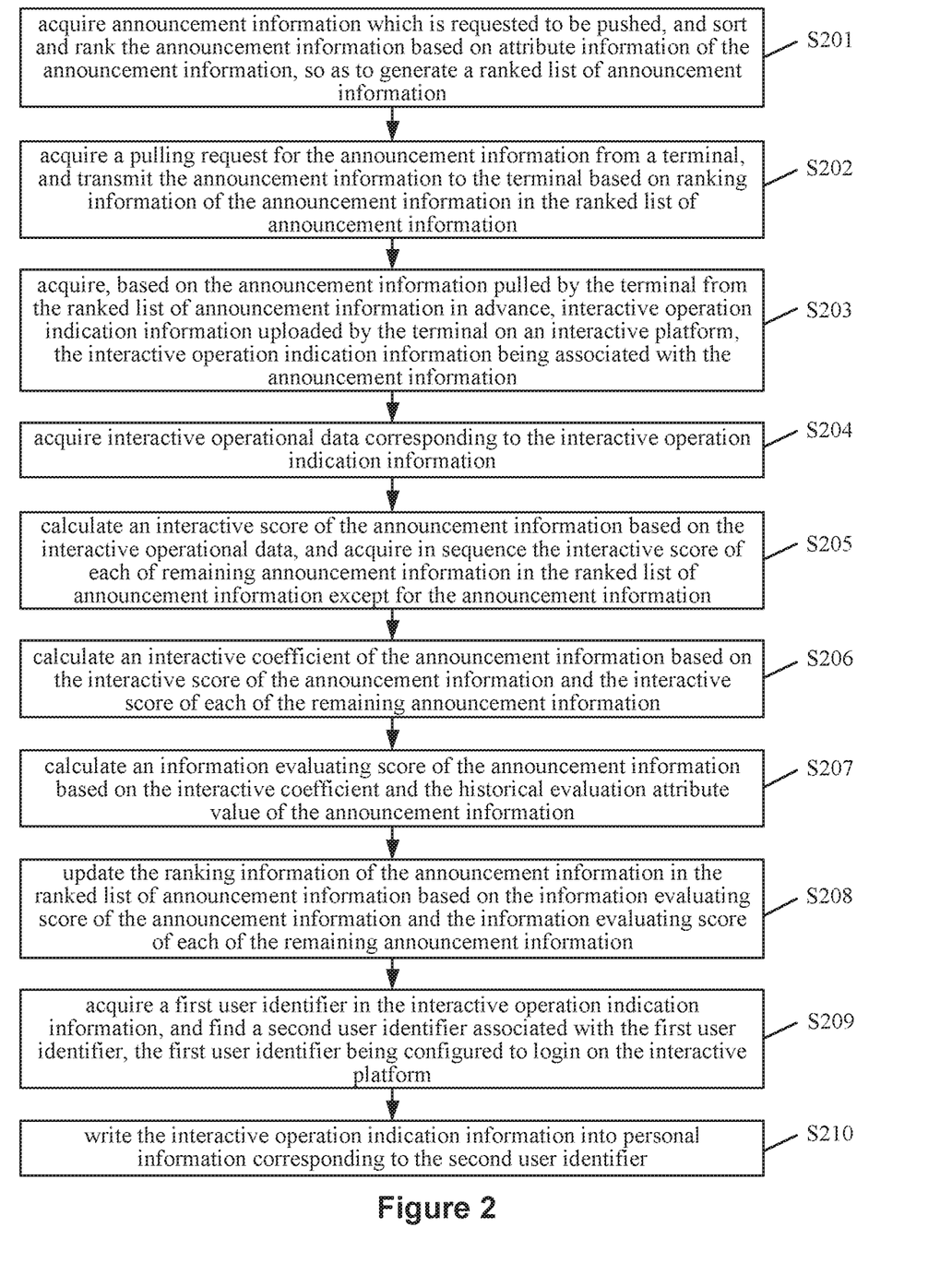
FIG. 2 is a schematic flowchart showing another method for information processing according to an embodiment of the present disclosure.

Reference is made to FIG. 2, which is a schematic flowchart showing another method for information processing according to an embodiment of the present disclosure. As shown in FIG. 2, the method according to an embodiment of the present disclosure may include step S201 to step S210 as follows.

In step S201, announcement information which is requested to be pushed is acquired, and the announcement information is sorted and ranked based on attribute information of the announcement information, so as to generate a ranked list of announcement information.

Specifically, in case that new announcement information is requested to be pushed, the apparatus for information processing may acquire the announcement information which is requested to be pushed, and sort and rank the announcement information based on attribute information of the announcement information, so as to generate the ranked list of announcement information. The attribute information includes a predetermined pushing condition and a historical evaluation attribute value. The predetermined pushing condition indicates a roughly determined user group to which the announcement information is to be pushed, for example, a user group of people aged from 20 to 30, or a user group of male. The historical evaluation attribute value is expressed as a historical click rate of the announcement information and the like. Practically, there is no historical evaluation attribute value such as the historical click rate for new announcement information, thus the attribute information of the new announcement information may further include a bid price of the announcement information and the like. The apparatus for information processing sorts the announcement information based on the predetermined pushing condition, ranks the announcement information based on the historical evaluation attribute value and the bid price, and finally generates a ranked list of announcement information. The ranked list of announcement information includes not only the announcement information, but also other announcement information which is under the same or approximate predetermined pushing conditions (abbreviated as "remaining announcement information" hereinafter).

In step S202, a pulling request for the announcement information is acquired from a terminal, and the announcement information is transmitted to the terminal based on ranking information of the announcement information in the ranked list of announcement information.

Specifically, the apparatus for information processing may acquire the pulling request from the terminal, and send the announcement information to the terminal based on the ranking information of the announcement information in the ranked list of announcement information. The ranking information may include at least one of a pulling probability and a ranking position. For the pulling probability, the apparatus for information processing may acquire an initial information evaluating score of the announcement information based on the historical evaluation attribute value and the bid price. Alternatively, based on an information evaluating score of the announcement information calculated based on the interactive operational data corresponding to the interactive operation indication information that is added subsequently, or based on the initial information evaluating score, the apparatus for information processing determines an occupied proportion of the score of the announcement information in the ranked list of announcement information, and sets the pulling probability of the announcement information based on the occupied proportion of the score. For the ranking position, the apparatus for information processing may acquire an initial information evaluating score of the announcement information based on the historical evaluation attribute value and the bid price. Alternatively, based on an information evaluating score of the announcement information calculated based on the interactive operational data corresponding to the interactive operation indication information that is added subsequently, or based on the initial information evaluating score, the apparatus for information processing determines a ranking of the score of the announcement information in the ranked list of announcement information, and assigns the ranking positions in sequence, so as to determine the pulling sequence of the announcement information by the terminal based on the ranking position. For the pulling probability and the ranking position, the apparatus for information processing may acquire an initial information evaluating score of the announcement information based on the historical evaluation attribute value and the bid price. Alternatively, based on an information evaluating score of the announcement information calculated based on the interactive operational data corresponding to the interactive operation indication information that is added subsequently, or based on the initial information evaluating score, the apparatus for information processing determines a ranking of the score of the announcement information in the ranked list of announcement information, assigns the ranking positions in sequence, and sets the pulling probability of the announcement information based on the ranking position. For example, the pulling probability is 50% if the announcement information is ranked in a first place, and the pulling probability is 30% if the announcement information is ranked in a second place, and so on. The pull probability is specifically expressed as the probability that the announcement information may be pulled by the terminal.

In step S203, acquiring, based on the announcement information pulled by a terminal from the ranked list of announcement information in advance, interactive operation indication information uploaded by the terminal on an interactive platform. The interactive operation indication information is associated with the announcement information.

Specifically, based on the announcement information pulled by the terminal from the ranked list of announcement information in advance, a user may perform an interactive operation on the announcement information via the terminal. The interactive operation includes, for example, inputting a comment at a predetermined position under the announcement information, adding a concern identifier for the announcement information, clicking on the concern identifier to concern the announcement information, and the like. The terminal may generate interactive operation indication information associated with the announcement information based on the interactive operation. The interactive operation indication information may specifically be record information generated in response to the interactive operation on the announcement information by the user. For example, in response to inputting a comment at the predetermined position under the announcement information, record information of one comment may be generated. The interactive operation indication information may be uploaded to the interactive platform by the terminal, and the interactive operation indication information uploaded by the terminal on the interactive platform may be acquired by an apparatus for information processing.

In step S204, interactive operational data corresponding to the interactive operation indication information is acquired.

Specifically, the apparatus for information processing may acquire the interactive operational data corresponding to the interactive operation indication information. It is to be understood that, each of the interactive operation indication information associated with the announcement information has corresponding interactive operation data. For example, the interactive operation data corresponding to inputting a comment at the predetermined position under the announcement information may be the same as that corresponding to adding a concern identifier for the announcement information. Practically, different interactive operational data may be set for a comment and a concern identifier, so as to distinguish the weights of them, and the interactive operational data corresponding to a comment should be greater than that corresponding to a concern identifier.

In step S205, an interactive score of the announcement information is calculated based on the interactive operational data, and the interactive score of each of remaining announcement information in the ranked list of announcement information except for the announcement information is acquired in sequence.

Specifically, the apparatus for information processing may calculate the interactive score of the announcement information based on the interactive operational data, and acquire in sequence the interactive score of each of remaining announcement information in the ranked list of announcement information except for the announcement information. It is to be understood that, since the announcement information may be acquired by multiple terminals, multiple users using the multiple terminals may perform an interactive operation on the announcement information separately. Therefore, the apparatus for information processing may perform statistics on the interactive operation indication information, and acquire one or more of interactive operational data corresponding to the statistics of all the interactive operation indication information at predetermined intervals, or acquire the corresponding interactive operational data once the interactive operation indication information is received. The apparatus for information processing may perform a summation process on all the acquired interactive operational data to obtain an interactive score of the announcement information, and similarly, obtain the interactive score of each of the remaining announcement information except for the said announcement information in the ranked list of announcement information.

In step S206, an interactive coefficient of the announcement information is calculated based on the interactive score of the announcement information and the interactive score of each of the remaining announcement information.

Specifically, the apparatus for information processing calculates an interactive coefficient of the announcement information based on the interactive score of the announcement information and the interactive score of each of the remaining announcement information. For example, if there are N pieces of announcement information, interactive scores of the announcement information are $Score_1$, $Score_2$, ..., $Score_N$ respectively, and the interactive coefficient $\delta_{sns}$ of each announcement information may be:

$$\delta_{sns(i)} = 1 + \lambda_{sns} \frac{Score_i - \sum_{i=1}^{N} Score_i/N}{\sqrt{\frac{\Sigma\, Score_i^2}{N} - \left(\frac{\Sigma\, Score}{N}\right)^2}}$$

In step S207, an information evaluating score of the announcement information is calculated based on the interactive coefficient and the historical evaluation attribute value of the announcement information.

Specifically, the apparatus for information processing calculates an information evaluating score of the announcement information based on the interactive coefficient and the historical evaluation attribute value of the announcement information. Preferably, the information evaluating score=the history evaluating attribute value*the interactive coefficient+(the bid price). A new information evaluating score may be obtained by adding the interactive coefficient, to distinguish the new information evaluating score from the initial information evaluating score, so that the announcement information is evaluated more objective based on the information evaluating score.

In step S208, the ranking information of the announcement information in the ranked list of announcement information is updated based on the information evaluating score of the announcement information and the information evaluating score of each of the remaining announcement information.

Specifically, the apparatus for information processing updates the ranking information of the announcement information in the ranked list of announcement information based on the information evaluating score of the announcement information and the information evaluating score of each of the remaining announcement information, and may turn to step S202.

In step S209, a first user identifier is acquired in the interactive operation indication information, and a second user identifier associated with the first user identifier is found, the first user identifier being configured to login on the interactive platform.

Specifically, the interactive operation indication information may further include the first user identifier which is used to login on the interactive platform. The apparatus for information processing may acquire the first user identifier, and find the second user identifier which is associated with the first user identifier. It is to be understood that, the second user identifier is also a user identifier used to login on the interactive platform. The first user identifier and the second user identifier may be user identifiers which are associated with each other in advance, such as in a friend relationship. The second user identifier may include at least one user identifier. Each of the first user identifier and the second user identifier is preferably a user identity (ID).

In step S210, the interactive operation indication information is written into personal information corresponding to the second user identifier.

Specifically, the apparatus for information processing may write the interactive operation indication information into the personal information corresponding to the second user identifier. The personal information is preferably information of a user who holds the second user identifier, or an information storage space set in advance according to the second user identifier. By writing the interactive operation indication information into the personal information corresponding to the second user identifier, the operation instruction information may be acquired from the personal information and displayed when the user pulls the announcement information when logging in on the interactive platform with the second user identifier. The user using the terminal may know operations of the friends who participate in the announcement information via the interactive operation indication information, such as interactive operations and click operations, so that the trust of the announcement information by users is increased, and thus the click rate and participation degree of the announcement information are improved. Also, since the interactive operation indication information is written into the personal information corresponding to the second user identifier in advance, the terminal capable of logging in on the interactive platform with the second user identifier, when pulling the announcement information, acquires the interactive operation indication information directly via an offline manner; without online finding and acquiring the historical interactive operation indication information performed on the announcement information by the first user identifier. With this, the efficiency of acquiring the interactive operation indication information corresponding to the announcement information is improved, and the resources required for the online finding are saved.

In the embodiments of the present disclosure, based on announcement information pulled by a terminal from a ranked list of announcement information in advance, interactive operation indication information uploaded by the terminal on an interactive platform is acquired, the interactive operation indication information being associated with the announcement information. Interactive operational data corresponding to the interactive operation indication information is acquired. Ranking information of the announcement information in the ranked list of announcement information is updated based on the interactive operational data. The interactive operational data corresponding to the interactive operation indication information is added, and the ranking information of the announcement information in the ranked list of announcement information is updated based on the interactive operational data, thereby affecting the ranking information of the announcement information by utilizing the interactive operations of a user, and thus avoiding vicious competition that is caused by affecting the ranking of the announcement information via a bid price. Further, an effect of the announcement information is improved, a pushing cost of the announcement information is reduced, and a pushing threshold of the announcement information is lowered. By adding the information evaluating score obtained based on the interactive coefficient, the announcement information is evaluated more objective. By writing the interactive operation indication information into the personal information corresponding to the second user identifier, the operation instruction information may be acquired from the personal information and displayed when the user pulls the announcement information when logging in on the interactive platform with the second user identifier. The user using the terminal may know operations of the friends who participate in the announcement information via the interactive operation indication information, so that the trust of the announcement information by users is increased, and thus the click rate and participation degree of the announcement information are improved.

Figure 3:
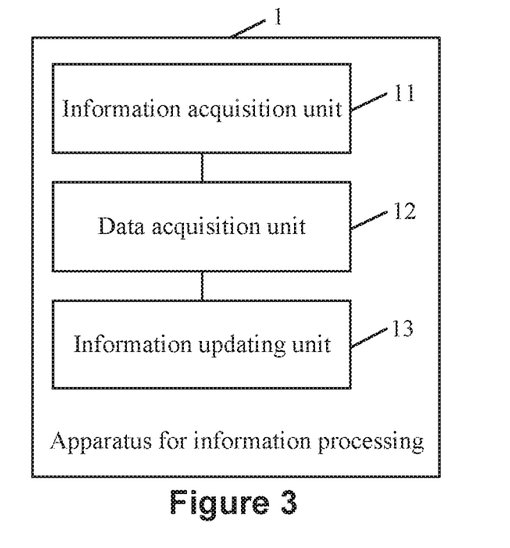
FIG. 3 is a schematic structure diagram showing an apparatus for information processing according to an embodiment of the present disclosure.
Figure 4:
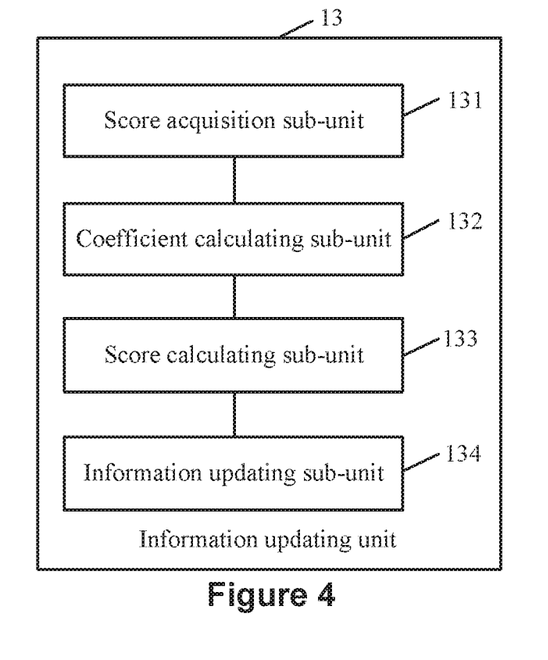
FIG. 4 is a schematic structure diagram showing an information updating unit according to an embodiment of the present disclosure.
Figure 5:
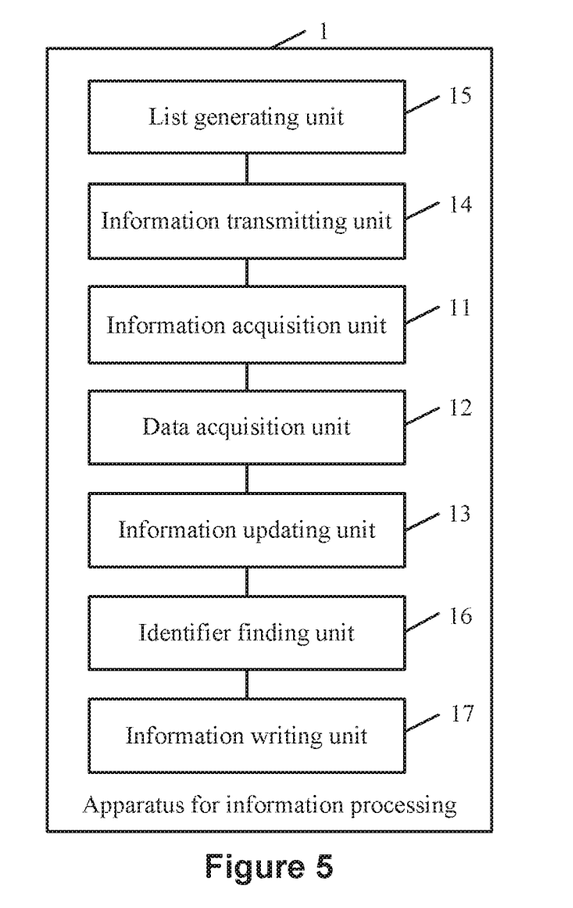
FIG. 5 is a schematic structure diagram showing another apparatus for information processing according to an embodiment of the present disclosure.

An apparatus for information processing according to the embodiments of the present disclosure will be described with details in conjunction with FIG. 3 to FIG. 5 as follows. It should be noted that, the apparatus for information processing as shown in FIG. 3 to FIG. 5 is configured to perform the methods according to the embodiments of the present disclosure as shown in FIG. 1 and FIG. 2. For illustrative purpose, only parts related to the embodiments of the present disclosure are illustrated. For specific technical details not shown, reference may be made to the embodiments of the present disclosure shown in FIG. 1 and FIG. 2.

Reference is made to FIG. 3, which is a schematic structure diagram showing an apparatus for information processing according to an embodiment of the present disclosure. As shown in FIG. 3, the apparatus for information processing 1 according to an embodiment of the present disclosure may include an information acquisition unit 11, a data acquisition unit 12 and an information updating unit 13.

The information acquisition unit 11 is configured to acquire, based on announcement information pulled by a terminal from a ranked list of announcement information in advance, interactive operation indication information uploaded by the terminal on an interactive platform, the interactive operation indication information being associated with the announcement information.

In a specific implementation, based on the announcement information pulled by the terminal from the ranked list of announcement information in advance, a user may perform an interactive operation on the announcement information via the terminal. The interactive operation includes, for example, inputting a comment at a predetermined position under the announcement information, adding a concern identifier for the announcement information, clicking on the concern identifier to concern the announcement information, and the like. The terminal may generate interactive operation indication information associated with the announcement information based on the interactive operation. The interactive operation indication information may specifically be record information generated in response to the interactive operation on the announcement information by the user. For example, in response to inputting a comment at the predetermined position under the announcement information, record information of one comment may be generated. The interactive operation indication information may be uploaded to the interactive platform by the terminal, and the interactive operation indication information uploaded by the terminal on the interactive platform may be acquired by the information acquisition unit 11.

The data acquisition unit 12 is configured to acquire interactive operational data corresponding to the interactive operation indication information.

In a specific implementation, the data acquisition unit 12 may acquire the interactive operational data corresponding to the interactive operation indication information. It is to be understood that, each of the interactive operation indication information associated with the announcement information has corresponding interactive operation data. For example, the interactive operation data corresponding to inputting a comment at the predetermined position under the announcement information may be the same as that corresponding to adding a concern identifier for the announcement information. Practically, different interactive operational data may be set for a comment and a concern identifier, so as to distinguish the weights of them, and the interactive operational data corresponding to a comment should be greater than that corresponding to a concern identifier.

The information updating unit 13 is configured to update ranking information of the announcement information in the ranked list of announcement information based on the interactive operational data, In a specific implementation, the information updating unit 13 may update the ranking information of the announcement information in the ranked list of announcement information based on the interactive operational data. Further, the information updating unit 13 may calculate an interactive score of the announcement information based on the interactive operational data, and acquire in sequence the interactive score of each of remaining announcement information in the ranked list of announcement information except for the announcement information. The information updating unit 13 may calculate an interactive coefficient of the announcement information based on the interactive score of the announcement information and the interactive score of each of the remaining announcement information. The information updating unit 13 may calculate an information evaluating score of the announcement information based on the interactive coefficient and the historical evaluation attribute value of the announcement information. The information updating unit 13 may update the ranking information of the announcement information in the ranked list of announcement information based on the information evaluating score of the announcement information and the information evaluating score of each of the remaining announcement information. The ranking information may specifically include at least one of a pulling probability of the announcement information and a ranking position of the announcement information in ranked list. Specifically, the pulling probability is expressed as the probability that the announcement information may be pulled by the terminal. After the updating, the information acquisition unit 11 may be informed to acquire the interactive operation indication information for a next time, until the announcement information has been off the shelves.

Specifically, reference is made to FIG. 4, which is a schematic structure diagram showing an information updating unit according to an embodiment of the present disclosure. As shown in FIG. 4, the information updating unit 13 may include a score acquisition sub-unit 131, a coefficient calculating sub-unit 132, a score calculating sub-unit 133 and an information updating sub-unit 134.

The score acquisition sub-unit 131 is configured to calculate an interactive score of the announcement information based on the interactive operational data, and acquire in sequence the interactive score of each of remaining announcement information in the ranked list of announcement information except for the announcement information.

In a specific implementation, the score acquisition sub-unit 131 may calculate the interactive score of the announcement information based on the interactive operational data, and acquire in sequence the interactive score of each of remaining announcement information in the ranked list of announcement information except for the announcement information. It is to be understood that, since the announcement information may be acquired by multiple terminals, multiple users using the multiple terminals may perform an interactive operation on the announcement information separately. Therefore, the data acquisition unit 12 may perform statistics on the interactive operation indication information, and acquire one or more of interactive operational data corresponding to the statistics of all the interactive operation indication information at predetermined intervals, or acquire the corresponding interactive operational data once the interactive operation indication information is received. The score acquisition sub-unit 131 may perform a summation process on all the acquired interactive operational data to obtain an interactive score of the announcement information, and similarly, obtain the interactive score of each of the remaining announcement information except for the said announcement information in the ranked list of announcement information.

The coefficient calculating sub-unit 132 is configured to calculate an interactive coefficient of the announcement information based on the interactive score of the announcement information and the interactive score of each of the remaining announcement information.

In a specific implementation, the coefficient calculating sub-unit 132 calculates an interactive coefficient of the announcement information based on the interactive score of the announcement information and the interactive score of each of the remaining announcement information. For example, if there are N pieces of announcement information, interactive scores of the announcement information are $Score_1, Score_2, \ldots, Score_N$ respectively, and the interactive coefficient $\delta_{sns}$ of each announcement information may be:

$$\delta_{sns(i)} = 1 + \lambda_{sns} \frac{\text{Score}_i - \sum_{i=1}^{N} \text{Score}_i/N}{\sqrt{\frac{\Sigma \text{Score}_i^2}{N} - \left(\frac{\Sigma \text{Score}_i}{N}\right)^2}}$$

The score calculating sub-unit 133 is configured to calculate an information evaluating score of the announcement information based on the interactive coefficient and the historical evaluation attribute value of the announcement information.

In a specific implementation, the score calculating sub-unit 133 calculates an information evaluating score of the announcement information based on the interactive coefficient and the historical evaluation attribute value of the announcement information. Preferably, the information evaluating score=the history evaluating attribute value* the interactive coefficient+(the bid price). A new information evaluating score may be obtained by adding the interactive coefficient, to distinguish the new information evaluating score from the initial information evaluating score, so that the announcement information is evaluated more objective based on the information evaluating score.

The information updating unit 134 is configured to update the ranking information of the announcement information in the ranked list of announcement information based on the information evaluating score of the announcement information and the information evaluating score of each of the remaining announcement information. After the updating, the information acquisition unit 11 may be informed to acquire the interactive operation indication information for a next time, until the announcement information has been off the shelves.

In the embodiments of the present disclosure, based on announcement information pulled by a terminal from a ranked list of announcement information in advance, interactive operation indication information uploaded by the terminal on an interactive platform is acquired, the interactive operation indication information being associated with the announcement information. Interactive operational data corresponding to the interactive operation indication information is acquired. Ranking information of the announcement information in the ranked list of announcement information is updated based on the interactive operational data. The interactive operational data corresponding to the interactive operation indication information is added, and the ranking information of the announcement information in the ranked list of announcement information is updated based on the interactive operational data, thereby affecting the ranking information of the announcement information by utilizing the interactive operations of a user, and thus avoiding vicious competition that is caused by affecting the ranking of the announcement information via a bid price. Further, an effect of the announcement information is improved, a pushing cost of the announcement information is reduced, and a pushing threshold of the announcement information is lowered. By adding the information evaluating score obtained based on the interactive coefficient, the announcement information is evaluated more objective.

Reference is made to FIG. 5, which is a schematic structure diagram showing an apparatus for information processing according to an embodiment of the present disclosure. As shown in FIG. 5, the apparatus for information processing 1 according to an embodiment of the present disclosure may include an information acquisition unit 11, a data acquisition unit 12, an information updating unit 13, an information transmitting unit 14, a list generating unit 15, an identifier finding unit 16 and an information writing unit 17.

The list generating unit 15 configured to acquire the announcement information which is requested to be pushed, and sort and rank the announcement information based on attribute information of the announcement information, so as to generate the ranked list of announcement information, the attribute information including a predetermined pushing condition and a historical evaluation attribute value.

In a specific implementation, in case that new announcement information is requested to be pushed, the list generating unit 15 may acquire the announcement information which is requested to be pushed, and sort and rank the announcement information based on attribute information of the announcement information, so as to generate the ranked list of announcement information. The attribute information includes a predetermined pushing condition and a historical evaluation attribute value. The predetermined pushing condition indicates a roughly determined user group to which the announcement information is to be pushed, for example, a user group of people aged from 20 to 30, or a user group of male. The historical evaluation attribute value is expressed as a historical click rate of the announcement information and the like. Practically, there is no historical evaluation attribute value such as the historical click rate for new announcement information, thus the attribute information of the new announcement information may further include a bid price of the announcement information and the like. The list generating unit 15 sorts the announcement information based on the predetermined pushing condition, ranks the announcement information based on the historical evaluation attribute value and the bid price, and finally generates a ranked list of announcement information. The ranked list of announcement information includes not only the announcement information, but also other announcement information which is under the same or approximate predetermined pushing conditions (abbreviated as "remaining announcement information" hereinafter).

The information transmitting unit 14 configured to acquire a pulling request for the announcement information from the terminal, and transmitting the announcement information to the terminal based on the ranking information of the announcement information in the ranked list of announcement information.

In a specific implementation, the information transmitting unit 14 may acquire the pulling request from the terminal, and send the announcement information to the terminal based on the ranking information of the announcement information in the ranked list of announcement information. The ranking information may include at least one of a pulling probability and a ranking position. For the pulling probability, the apparatus for information processing 1 may acquire an initial information evaluating score of the announcement information based on the historical evaluation attribute value and the bid price. Alternatively, based on an information evaluating score of the announcement information calculated based on the interactive operational data corresponding to the interactive operation indication information that is added subsequently, or based on the initial information evaluating score, the apparatus for information processing 1 determines an occupied proportion of the score of the announcement information in the ranked list of announcement information, and sets the pulling probability of the announcement information based on the occupied proportion of the score. For the ranking position, the apparatus for information processing 1 may acquire an initial information evaluating score of the announcement information based on the historical evaluation attribute value and the bid price. Alternatively, based on an information evaluating score of the announcement information calculated based on the interactive operational data corresponding to the interactive operation indication information that is added subsequently, or based on the initial information evaluating score, the apparatus for information processing 1 determines a ranking of the score of the announcement information in the ranked list of announcement information, and assigns the ranking positions in sequence, so as to determine the pulling sequence of the announcement information by the terminal based on the ranking position. For the pulling probability and the ranking position, the apparatus for information processing 1 may acquire an initial information evaluating score of the announcement information based on the historical evaluation attribute value and the bid price. Alternatively, based on an information evaluating score of the announcement information calculated based on the interactive operational data corresponding to the interactive operation indication information that is added subsequently, or based on the initial information evaluating score, the apparatus for information processing 1 determines a ranking of the score of the announcement information in the ranked list of announcement information, assigns the ranking positions in sequence, and sets the pulling probability of the announcement information based on the ranking position. For example, the pulling probability is 50% if the announcement information is ranked in a first place, and the pulling probability is 30% if the announcement information is ranked in a second place, and so on. The pull probability is specifically expressed as the probability that the announcement information may be pulled by the terminal.

The information acquisition unit 11 is configured to acquire, based on announcement information pulled by a terminal from a ranked list of announcement information in advance, interactive operation indication information uploaded by the terminal on an interactive platform, the interactive operation indication information being associated with the announcement information.

In a specific implementation, based on the announcement information pulled by the terminal from the ranked list of announcement information in advance, a user may perform an interactive operation on the announcement information via the terminal. The interactive operation includes, for example, inputting a comment at a predetermined position under the announcement information, adding a concern identifier for the announcement information, clicking on the concern identifier to concern the announcement information, and the like. The terminal may generate interactive operation indication information associated with the announcement information based on the interactive operation. The interactive operation indication information may specifically be record information generated in response to the interactive operation on the announcement information by the user. For example, in response to inputting a comment at the predetermined position under the announcement information, record information of one comment may be generated. The interactive operation indication information may be uploaded to the interactive platform by the terminal, and the interactive operation indication information uploaded by the terminal on the interactive platform may be acquired by the information acquisition unit 11.

The data acquisition unit 12 is configured to acquire interactive operational data corresponding to the interactive operation indication information.

In a specific implementation, the data acquisition unit 12 may acquire the interactive operational data corresponding to the interactive operation indication information. It is to be understood that, each of the interactive operation indication information associated with the announcement information has corresponding interactive operation data. For example, the interactive operation data corresponding to inputting a comment at the predetermined position under the announcement information may be the same as that corresponding to adding a concern identifier for the announcement information. Practically, different interactive operational data may be set for a comment and a concern identifier, so as to distinguish the weights of them, and the interactive operational data corresponding to a comment should be greater than that corresponding to a concern identifier.

The information updating unit 13 is configured to update ranking information of the announcement information in the ranked list of announcement information based on the interactive operational data, In a specific implementation, the information updating unit 13 may update the ranking information of the announcement information in the ranked list of announcement information based on the interactive operational data. Further, the information updating unit 13 may calculate an interactive score of the announcement information based on the interactive operational data, and acquire in sequence the interactive score of each of remaining announcement information in the ranked list of announcement information except for the announcement information. The information updating unit 13 may calculate an interactive coefficient of the announcement information based on the interactive score of the announcement information and the interactive score of each of the remaining announcement information. The information updating unit 13 may calculate an information evaluating score of the announcement information based on the interactive coefficient and the historical evaluation attribute value of the announcement information. The information updating unit 13 may update the ranking information of the announcement information in the ranked list of announcement information based on the information evaluating score of the announcement information and the information evaluating score of each of the remaining announcement information. The ranking information may specifically include at least one of a pulling probability of the announcement information and a ranking position of the announcement information in ranked list. Specifically, the pulling probability is expressed as the probability that the announcement information may be pulled by the terminal. After the updating, the information transmitting unit 14 may be informed to acquire the pulling request for the announcement information for a next time, until the announcement information has been off the shelves.

Specifically, reference is made to FIG. 4, which is a schematic structure diagram showing an information updating unit according to an embodiment of the present disclosure. As shown in FIG. 4, the information updating unit 13 may include a score acquisition sub-unit 131, a coefficient calculating sub-unit 132, a score calculating sub-unit 133, an information updating unit 134, an identifier finding unit 16 and an information writing unit 17.

The score acquisition sub-unit 131 is configured to calculate an interactive score of the announcement information based on the interactive operational data, and acquire in sequence the interactive score of each of remaining announcement information in the ranked list of announcement information except for the announcement information.

In a specific implementation, the score acquisition sub-unit 131 may calculate the interactive score of the announcement information based on the interactive operational data, and acquire in sequence the interactive score of each of remaining announcement information in the ranked list of announcement information except for the announcement information. It is to be understood that, since the announcement information may be acquired by multiple terminals, multiple users using the multiple terminals may perform an interactive operation on the announcement information separately. Therefore, the data acquisition unit 12 may perform statistics on the interactive operation indication information, and acquire one or more of interactive operational data corresponding to the statistics of all the interactive operation indication information at predetermined intervals, or acquire the corresponding interactive operational data once the interactive operation indication information is received. The score acquisition sub-unit 131 may perform a summation process on all the acquired interactive operational data to obtain an interactive score of the announcement information, and similarly, obtain the interactive score of each of the remaining announcement information except for the said announcement information in the ranked list of announcement information.

The coefficient calculating sub-unit 132 is configured to calculate an interactive coefficient of the announcement information based on the interactive score of the announcement information and the interactive score of each of the remaining announcement information.

In a specific implementation, the coefficient calculating sub-unit 132 calculates an interactive coefficient of the announcement information based on the interactive score of the announcement information and the interactive score of each of the remaining announcement information. For example, if there are N pieces of announcement information, interactive scores of the announcement information are $Score_1, Score_2, \ldots, Score_N$ respectively, and the interactive coefficient $\delta_{sns}$ of each announcement information may be:

$$\delta_{sns(i)} = 1 + \lambda_{sns} \frac{Score_i - \sum_{i=1}^{N} Score_i/N}{\sqrt{\frac{\Sigma Score_i^2}{N} - \left(\frac{\Sigma Score_i}{N}\right)^2}}$$

The score calculating sub-unit 133 is configured to calculate an information evaluating score of the announcement information based on the interactive coefficient and the historical evaluation attribute value of the announcement information.

In a specific implementation, the score calculating sub-unit 133 calculates an information evaluating score of the announcement information based on the interactive coefficient and the historical evaluation attribute value of the announcement information. Preferably, the information evaluating score=the history evaluating attribute value * the interactive coefficient+(the bid price). A new information evaluating score may be obtained by adding the interactive coefficient, to distinguish the new information evaluating score from the initial information evaluating score, so that the announcement information is evaluated more objective based on the information evaluating score.

The information update unit 134 is configured to update the ranking information of the announcement information in the ranked list of announcement information based on the information evaluating score of the announcement information and the information evaluating score of each of the remaining announcement information. After the updating, the information transmitting unit 14 may be informed to acquire the pulling request for the announcement information for a next time, until the announcement information has been off the shelves.

The identifier finding unit 16 is configured to acquire a first user identifier in the interactive operation indication information, and find a second user identifier associated with the first user identifier, the first user identifier being configured to login on the interactive platform.

In a specific implementation, the interactive operation indication information may further include the first user identifier which is used to login on the interactive platform. The identifier finding unit 16 may acquire the first user identifier, and find the second user identifier which is associated with the first user identifier. It is to be understood that, the second user identifier is also a user identifier used to login on the interactive platform. The first user identifier and the second user identifier may be user identifiers which are associated with each other in advance, such as in a friend relationship. The second user identifier may include at least one user identifier. Each of the first user identifier and the second user identifier is preferably a user ID.

The information writing unit 17 is configured to write the interactive operation indication information into personal information corresponding to the second user identifier;

In a specific implementation, the information writing unit 17 may write the interactive operation indication information into the personal information corresponding to the second user identifier. The personal information is preferably information of a user who holds the second user identifier, or an information storage space set in advance according to the second user identifier. By writing the interactive operation indication information into the personal information corresponding to the second user identifier, the operation instruction information may be acquired from the personal information and displayed when the user pulls the announcement information when logging in on the interactive platform with the second user identifier. The user using the terminal may know operations of the friends who participate in the announcement information via the interactive operation indication information, such as interactive operations and click operations, so that the trust of the announcement information by users is increased, and thus the click rate and participation degree of the announcement information are improved. Also, since the interactive operation indication information is written into the personal information corresponding to the second user identifier in advance, the terminal capable of logging in on the interactive platform with the second user identifier, when pulling the announcement information, acquires the interactive operation indication information directly via an offline manner; without online finding and acquiring the historical interactive operation indication information performed on the announcement information by the first user identifier. With this, the efficiency of acquiring the interactive operation indication information corresponding to the announcement information is improved, and the resources required for the online finding are saved.

In the embodiments of the present disclosure, based on announcement information pulled by a terminal from a ranked list of announcement information in advance, interactive operation indication information uploaded by the terminal on an interactive platform is acquired, the interactive operation indication information being associated with the announcement information. Interactive operational data corresponding to the interactive operation indication information is acquired. Ranking information of the announcement information in the ranked list of announcement information is updated based on the interactive operational data. The interactive operational data corresponding to the interactive operation indication information is added, and the ranking information of the announcement information in the ranked list of announcement information is updated based on the interactive operational data, thereby affecting the ranking information of the announcement information by utilizing the interactive operations of a user, and thus avoiding vicious competition that is caused by affecting the ranking of the announcement information via a bid price. Further, an effect of the announcement information is improved, a pushing cost of the announcement information is reduced, and a pushing threshold of the announcement information is lowered. By adding the information evaluating score obtained based on the interactive coefficient, the announcement information is evaluated more objective. By writing the interactive operation indication information into the personal information corresponding to the second user identifier, the operation instruction information may be acquired from the personal information and displayed when the user pulls the announcement information when logging in on the interactive platform with the second user identifier. The user using the terminal may know operations of the friends who participate in the announcement information via the interactive operation indication information, so that the trust of the announcement information by users is increased, and thus the click rate and participation degree of the announcement information are improved.

Figure 6:
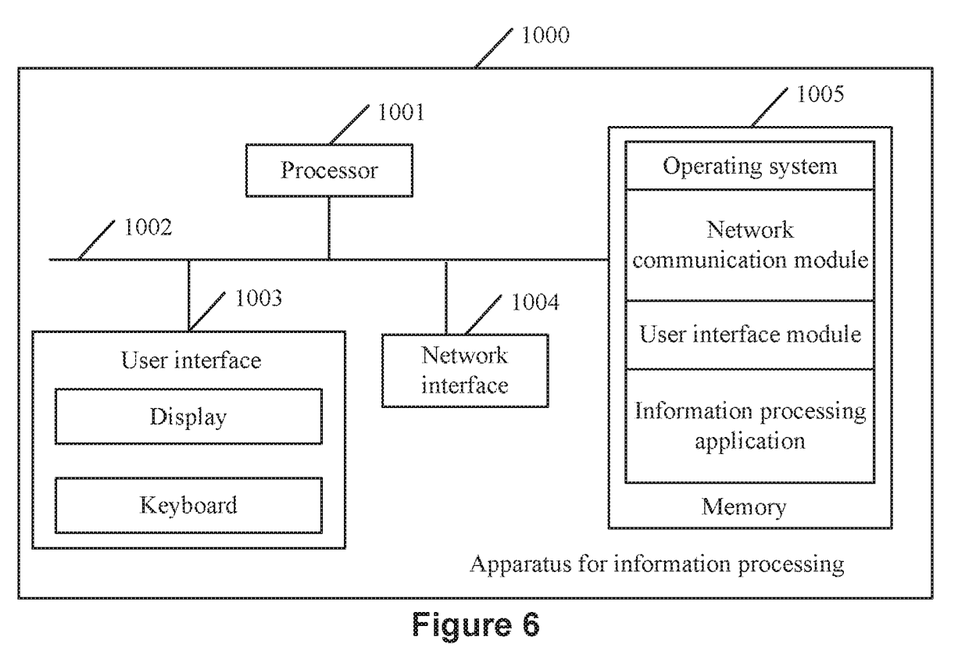
FIG. 6 is a schematic structure diagram showing another apparatus for information processing according to an embodiment of the present disclosure.

Reference is made to FIG. 6, which is a schematic structure diagram showing another apparatus for information processing according to an embodiment of the present disclosure. As shown in FIG. 6, the apparatus for information processing 1000 may include at least one processor 1001, such as a central processing unit (CPU), at least one network interface 1004, a user interface 1003, a memory 1005, and at least one communication bus 1002. The communication bus 1002 is configured to realize the connection and communication between these components. The user interface 1003 may include a display and a keyboard. An optional user interface 1003 may also include a standard wired interface and a wireless interface. The network interface 1004 may optionally include a standard wired interface and a wireless interface (such as a WI-FI interface). The memory 1005 may be a high-speed random access memory (RAM), or a non-volatile memory, such as at least one disk memory. The memory 1005 may optionally also include at least one storage device located far away from the processor 1001. As shown in FIG. 6, the memory 1005 as a kind of computer storage medium may include an operating system, a network communication module, a user interface module, an information processing application, and may further include units within the apparatus for information processing described above.

In the apparatus for information processing 1000 as shown in FIG. 6, the user interface 1003 is mainly configured to provide a user with input and acquire data inputted by the user. The processor 1001 may be configured to call the information processing application stored in the memory 1005, and execute the following operations:

acquiring, based on announcement information pulled by a terminal from a ranked list of announcement information in advance, interactive operation indication information uploaded by the terminal on an interactive platform, the interactive operation indication information being associated with the announcement information;

acquiring interactive operational data corresponding to the interactive operation indication information; and updating ranking information of the announcement information in the ranked list of announcement information based on the interactive operational data, the announcement information is passively pulled from the ranked list of announcement information based on the ranking information, and the ranking information includes at least one of a pulling probability and a ranking position.

In an embodiment, before the acquiring, based on the announcement information pulled by the terminal in advance, the interactive operation indication information uploaded by the terminal on the interactive platform, the interactive operation indication information being associated with the announcement information, the processor 1001 further performs the following operations:

acquiring a pulling request for the announcement information from the terminal, and transmitting the announcement information to the terminal based on the ranking information of the announcement information in the ranked list of announcement information, the ranking information including at least one of a pulling probability and a ranking position.

In an embodiment, before the acquiring the pulling request for the announcement information from the terminal, and the transmitting the announcement information to the terminal based on the ranking information of the announcement information in the ranked list of announcement information, the processor 1001 further performs the following operations:

acquiring the announcement information which is requested to be pushed, and sorting and ranking the announcement information based on attribute information of the announcement information, so as to generate the ranked list of announcement information, the attribute information including a predetermined pushing condition and a historical evaluation attribute value.

In an embodiment, the processor 1001 updates the ranking information of the announcement information in the ranked list of announcement information based on the interactive operational data by performs the following operations:

calculating an interactive score of the announcement information based on the interactive operational data, and acquiring in sequence the interactive score of each of remaining announcement information in the ranked list of announcement information except for the announcement information;

calculating an interactive coefficient of the announcement information based on the interactive score of the announcement information and the interactive score of each of the remaining announcement information;

calculating an information evaluating score of the announcement information based on the interactive coefficient and the historical evaluation attribute value of the announcement information; and updating the ranking information of the announcement information in the ranked list of announcement information based on the information evaluating score of the announcement information and the information evaluating score of each of the remaining announcement information.

In an embodiment, the processor 1001 further performs the following operations:

acquiring a first user identifier in the interactive operation indication information, and finding a second user identifier associated with the first user identifier, the first user identifier being configured to login on the interactive platform; and writing the interactive operation indication information into personal information corresponding to the second user identifier.

In the embodiments of the present disclosure, based on announcement information pulled by a terminal from a ranked list of announcement information in advance, interactive operation indication information uploaded by the terminal on an interactive platform is acquired, the interactive operation indication information being associated with the announcement information. Interactive operational data corresponding to the interactive operation indication information is acquired. Ranking information of the announcement information in the ranked list of announcement information is updated based on the interactive operational data. The interactive operational data corresponding to the interactive operation indication information is added, and the ranking information of the announcement information in the ranked list of announcement information is updated based on the interactive operational data, thereby affecting the ranking information of the announcement information by utilizing the interactive operations of a user, and thus avoiding vicious competition that is caused by affecting the ranking of the announcement information via a bid price. Further, an effect of the announcement information is improved, a pushing cost of the announcement information is reduced, and a pushing threshold of the announcement information is lowered. By adding the information evaluating score obtained based on the interactive coefficient, the announcement information is evaluated more objective. By writing the interactive operation indication information into the personal information corresponding to the second user identifier, the operation instruction information may be acquired from the personal information and displayed when the user pulls the announcement information when logging in on the interactive platform with the second user identifier. The user using the terminal may know operations of the friends who participate in the announcement information via the interactive operation indication information, so that the trust of the announcement information by users is increased, and thus the click rate and participation degree of the announcement information are improved.

It should be understanding by those skilled in the art, that the whole or parts of the processes in the methods according to the embodiments described above, can be completed via a computer program by instructing the related hardware; the program may be stored in a computer readable storage medium, when the program is executed, processes according to embodiments described above can be included. The storage medium may be a hard disk, an optical disk, Read-Only Memory (ROM) or Random Access Memory (RAM), or the like.

What is described above is only some embodiments of the disclosure and is not intended to define the disclosure. Therefore, any equivalents of the present disclosure should fall within the scope of protection of the disclosure.

What is claimed is:

1. A method for information processing, comprising:
   acquiring, based on a plurality of announcements pulled by a first terminal from a ranked list of the plurality of announcements interactive operation indication information uploaded by the first terminal on an interactive platform, the interactive operation indication information being associated with the plurality of announcements and comprising a record of a comment input by a first user corresponding to an announcement of the plurality of announcements the comment separate from the announcement, the record indicating that the first user input the comment corresponding to the announcement and the record to be displayed by a second terminal when the announcement is pulled from the ranked list by the second terminal;
   acquiring interactive operational data corresponding to the interactive operation indication information; and
   updating ranking information of the plurality of announcements in the ranked list of the plurality of announcements based on the record of the comment input by the first user, wherein the ranking information comprises ranking positions of the plurality of announcements in the ranked list and pulling probabilities for the plurality of announcements, each pulling probability indicating a probability that a corresponding one of the plurality of announcements will be pulled by the second terminal;
   acquiring a first user identifier of the first user in the interactive operation indication information, and finding a second user identifier of a second user associated with the first user identifier, with the first user identifier being configured to login on the interactive platform;
   writing the interactive operation indication information into an information storage space set in advance according to the second user identifier,
   acquiring pulling request for the announcement from the second terminal in response to the second user logging in on the interactive platform with the second user identifier; and
   in response to the pulling request, transmitting, to the second terminal, the announcement according to the updated ranking information, and the record of the comment for display on the second terminal.

2. The method according to claim wherein the pulling request comprises a second pulling request, and wherein before the acquiring, based on the plurality of announcements pulled by the first terminal, the interactive operation indication information uploaded by the first terminal on the interactive platform, the interactive operation indication information being associated with the plurality of announcements, the method further comprises:
   acquiring a first pulling request for the plurality of announcements from the first terminal, and transmitting one or more of the plurality of announcements to the first terminal based on the ranking information of the plurality of announcements in the ranked list of the plurality of announcements.

3. The method according to claim 2, wherein before the acquiring the pulling request for the plurality of announcements from the first terminal, and the transmitting the one or more announcements to the first terminal based on the ranking information of the plurality of announcements in the ranked list of the plurality of announcements, the method further comprises:
   acquiring the plurality of announcements requested to be pushed, and sorting and ranking the plurality of announcements based on attribute information of the plurality of announcements, so as to generate the ranked list of the plurality of announcements, the attribute information comprising a predetermined pushing condition and a historical evaluation attribute value.

4. The method according to claim 1, wherein the updating the ranking information of the plurality of announcements in the ranked list of the plurality of announcements based on the interactive operational data comprises:

calculating an interactive score of the announcement based on the interactive operational data, and acquiring in sequence interactive scores of remaining announcements of the plurality of announcements in the ranked list of the plurality of announcements except for the announcement;

calculating an interactive coefficient of the announcement based on the interactive score of the announcement and the interactive scores of the remaining announcements;

calculating a plurality of information evaluating scores of the plurality of announcements based on the interactive coefficient of the announcement, the interactive scores of the remaining announcements, and the historical evaluation attribute value of the plurality of announcements; and updating the ranking information of the plurality of announcements in the ranked list of the plurality of announcements based on the plurality of information evaluating scores of the plurality of announcements.

5. An apparatus for information processing, comprising:
a processor; and
a memory storing compute executable instructions that are executable by the processor, wherein the processor, when executing the computer executable instructions is configured to:
acquire, based on a plurality of announcements pulled by a first terminal from a ranked list of the plurality of announcements interactive operation indication information uploaded by the first terminal on an interactive platform, the interactive operation indication information being associated with the plurality of announcements and comprising a record of a comment input by a first user corresponding to an announcement of the plurality of announcements the comment separate from the announcement, the record indicating that the first user input the comment corresponding to the announcement and the record to be displayed by a second terminal when the announcement is pulled from the ranked list by the second terminal;
acquire interactive operational data corresponding to the interactive operation indication information; and
update ranking information of the plurality of announcements in the ranked list of the plurality of announcements based on the record of the comment input by the first user, wherein the ranking information comprises ranking positions of the plurality of announcements in the ranked list and pulling probabilities for the plurality of announcements, each pulling probability indicating a probability that a corresponding one of the plurality of announcements will be pulled by the second terminal;
acquire a first user identifier of the first user in the interactive operation indication information, and finding a second user identifier of a second user associated with the first user identifier, with the first user identifier being configured to login on the interactive platform;
write the interactive operation indication information into an information storage space set in advance according to the second user identifier,
acquire a pulling request for the announcement from the second terminal in response to the second user logging in on the interactive platform with the second user identifier; and
in response to the pulling request, transmitting, to the second terminal, the announcement according to the updated ranking information, and the record of the comment for display on the second terminal.

6. The apparatus according to claim 5, wherein the pulling request comprises a second pulling request, and wherein the processor, when executing the computer executable instructions, is further configured to:
acquire a first pulling request for the plurality of announcements from the first terminal, and transmit one or more of the plurality of announcements to the first terminal based on the ranking information of the plurality of announcements in the ranked list of the plurality of announcements.

7. The apparatus according to claim 6, wherein the processor, when executing the computer executable instructions, is further configured to:
acquire the plurality of announcements requested to be pushed, and sort and rank the plurality of announcements based on attribute information of the plurality of announcements, so as to generate the ranked list of the plurality of announcements, the attribute information comprising a predetermined pushing condition and a historical evaluation attribute value.

8. The apparatus according to claim 5, wherein the wherein the processor, when executing the computer executable instructions, is further configured to:
calculate an interactive score of the announcements based on the interactive operational data, and acquire in sequence interactive scores of each of remaining announcements of the plurality of announcements in the ranked list of the plurality of announcements except for the announcement;
calculate an interactive coefficient of the announcement based on the interactive score of the announcement and the interactive scores of each of the remaining announcements;
calculate a plurality of information evaluating scores of the plurality of announcements based on the interactive coefficient of the announcement, the interactive scores of the remaining announcements, and the historical evaluation attribute value of the plurality of announcements; and
update the ranking information of the plurality of announcements in the ranked list of the plurality of announcements based on the plurality of information evaluating scores of the plurality of announcements.

9. A non-transitory computer storage medium comprising computer executable instructions that, when executed by a processor, cause the processor to:
acquire, based on a plurality of announcements pulled by a first terminal from a ranked list of the plurality of announcements interactive operation indication information uploaded by the first terminal on an interactive platform, the interactive operation indication information being associated with the plurality of announcements and comprising a record of a comment input by a first user corresponding to an announcement of the plurality of announcements the comment separate from the announcement, the record indicating that the first user input the comment corresponding to the announcement and the record to be displayed by a second terminal when the announcement is pulled from the ranked list by the second terminal;
acquire interactive operational data corresponding to the interactive operation indication information; and
update ranking information of the plurality of announcements in the ranked list of the plurality of announcements based on the record of the comment input by the first user, wherein the ranking information comprises ranking positions of the plurality of announcements in the ranked list and pulling probabilities for the plurality of announcements, each pulling probability indicating a probability that a corresponding one of the plurality of announcements will be pulled by the second terminal;

acquire a first user identifier of the first user in the interactive operation indication information, and finding a second user identifier of a second user associated with the first user identifier, with the first user identifier being configured to login on the interactive platform;

write the interactive operation indication information into an information storage space set in advance according to the second user identifier, acquire a pulling request for the announcement from the second terminal in response to the second user logging in on the interactive platform with the second user identifier; and in response to the pulling request, transmitting, to the second terminal, the announcement according to the updated ranking information, and the record of the comment for display on the second terminal.

10. The non-transitory computer storage medium according to claim 9, wherein the pulling request comprises a second pulling request, and wherein the computer executable instructions, when executed by the processor, further cause the processor to:

acquire a pulling request for the plurality of announcements information from the first terminal, and transmit one or more of the plurality of announcements to the first terminal based on the ranking information of the plurality of announcements in the ranked list of plurality of announcements.

11. The non-transitory computer storage medium according to claim 10, wherein the computer executable instructions, when executed by the processor, further cause the processor to:

acquire the plurality of announcements requested to be pushed, and sort and rank the plurality of announcements based on attribute information of the plurality of announcements, so as to generate the ranked list of the plurality of announcements, the attribute information comprising a predetermined pushing condition and a historical evaluation attribute value.

12. The non-transitory computer storage medium according to claim 9, wherein the computer executable instructions, when executed by the processor, further cause the processor to:

calculate an interactive score of the announcements based on the interactive operational data, and acquire in sequence interactive scores of each of remaining announcements of the plurality of announcements in the ranked list of the plurality of announcements except for the announcement;

calculate an interactive coefficient of the announcement based on the interactive score of the announcement and the interactive scores of the remaining announcements;

calculate a plurality of information evaluating scores of the plurality of announcements based on the interactive coefficient of the announcement, the interactive scores of the remaining announcements, and the historical evaluation attribute value of the plurality of announcements; and update the ranking information of the plurality of announcements in the ranked list of the plurality of announcements based on the plurality of information evaluating scores of the plurality of announcements.

\* \* \* \* \*